United States Patent [19]

Yamada

[11] Patent Number: 4,524,366

[45] Date of Patent: Jun. 18, 1985

[54] INK JET CHARGE PHASING APPARATUS

[75] Inventor: Takahiro Yamada, Ibaraki, Japan

[73] Assignees: Hitachi, Ltd.; Hitachi Koki Co., Ltd., both of Tokyo, Japan

[21] Appl. No.: 610,800

[22] Filed: May 16, 1984

[30] Foreign Application Priority Data

May 20, 1983 [JP] Japan ............ 58-87566

[51] Int. Cl.$^3$ ............ G01D 18/00

[52] U.S. Cl. ............ 346/75

[58] Field of Search ............ 346/75

[56] References Cited

U.S. PATENT DOCUMENTS

| | | | |
|---|---|---|---|
| 4,016,571 | 4/1977 | Yamada | 346/75 |
| 4,121,223 | 10/1978 | Omori et al. | 346/75 |
| 4,288,796 | 9/1981 | Aiba et al. | 346/75 |
| 4,373,164 | 2/1983 | Osaki et al. | 346/75 |

FOREIGN PATENT DOCUMENTS

| | | | |
|---|---|---|---|
| 53-8460 | 3/1978 | Japan | 346/75 |
| 54-12226 | 1/1979 | Japan | 346/75 |

*Primary Examiner*—E. A. Goldberg
*Assistant Examiner*—Gerald E. Preston
*Attorney, Agent, or Firm*—Antonelli, Terry & Wands

[57] ABSTRACT

In an ink jet recording apparatus of charge control type, a pair of independent electrode plates serving as a charging electrode are disposed so as to face each other with the flying path of ink droplets between the electrode plates, and the connection of signal processing circuits to the electrode plates is controlled by change-over means so that a phase-search-signal generating circuit and a phase detecting circuit are connected to one and the other of the electrode plates, respectively, at a phase search period, and a recording-signal generating circuit is connected to both of the electrode plates at a recording period.

3 Claims, 4 Drawing Figures

INK JET CHARGE PHASING APPARATUS

BACKGROUND OF THE INVENTION

1. Field of the Invention

The present invention relates to an ink jet recording apparatus, and more particularly to an improvement in a system for searching the phase of ink droplet production.

2. Description of the Prior Art

In an ink jet recording apparatus of charge control type, a piezoelectric element mounted on an ink ejecting nozzle is energized with a high-frequency voltage to make the nozzle vibrate, and thus the ink ejected from the nozzle is changed into ink droplets in synchronism with the waveform of the high-frequency voltage. A charging electrode is disposed in the vicinity of a region where the ejected ink changes into ink droplets, and a phase searching signal is first applied to the charging electrode. Then, the electric charge of an ink droplet which has been electrified by the phase searching signal, is detected to search the phase of ink droplet production. Thereafter, a recording signal synchronized with ink droplet production is applied to the charging electrode, and thus the electrification of ink droplets is controlled by the recording signal. A deflection electrode is disposed on the flying path of the ink droplets, to deflect the flying ink droplets in accordance with the electric charge thereof. A collector is disposed on the flying path of both an ink droplet which has been electrified by the phase searching signal, and an ink droplet which has not been electrified by the recording signal, to collect (or catch) these ink droplets. While, an ink droplet which has been electrified by the recording signal, flies clear of the collector, and is then deposited on a recording medium.

In the ink jet recording apparatus of this kind, in order to record an accurate image on a recording medium, it is required to accurately control the electrification of ink droplets. Accordingly, it is necessary to adjust the time each voltage pulse of the recording signal is generated, so as to match the time each ink droplet is produced. The above-mentioned phase searching signal is used for such a phase adjustment.

As disclosed in a U.S. Pat. No. 4,016,571 to T. YAMADA and a U.S. Pat. No. 4,121,223 to H. Omori et al., the phase of ink droplet production can be known in such a manner that the electric charge of an ink droplet electrified by the phase searching signal is detected by an induction-type or collision-type sensor which is provided on the flying path of the ink droplet. In such a method, however, the sensor is disposed between the deflection electrode and recording medium, and therefore there arises a problem that the flying path of ink droplets becomes longer and the deviation of flying path is increased. In order to solve this problem, various methods have been proposed in which the phase of ink droplet production is detected on the basis of a change in a current due to charged ink droplets. In one of these methods, as disclosed in, for example, a Japanese Patent Application (Publication No. 8460/1978), a voltage is applied between the ink in the nozzle and the charging electrode, and the phase of ink droplet production is detected by a change in a current flowing through the charging electrode. In this method, however, owing to a useless leakage current flowing through an ink supply system, there is a danger of ink being subjected to electrolysis at the connecting point of the ink and a power source for detecting the production of ink droplets, and thus changing in quality. In another one of the above methods, as disclosed in a Japanese Patent Application (Laid-open No. 12226/1979), the phase of ink droplet production is detected by a change in a current flowing through the nozzle. In this method, however, noise generated in an ink supply system by external disturbances is introduced into a detection circuit, and thus a detection error is increased.

SUMMARY OF THE INVENTION

It is accordingly an object of the present invention to provide an ink jet recording apparatus including a system for searching the phase of ink droplet production which can accurately detect the electric charge of ink droplet without necessitating a long, ink-droplet flying path which increases the deviation of flying path, and without deteriorating the quality of ink.

In order to attain the above object, according to the present invention, there is provided an ink jet recording apparatus including means for ejecting ink to change the ejected ink into ink droplets, a charging electrode disposed in the vicinity of a region where the ejected ink is changed into ink droplets, recording-signal generating means for applying a recording signal to the charging electrode to electrify an ink droplet, deflection means for deflecting the ink droplet in accordance with the electric charge thereof given by said recording signal, to deposit the ink droplet on a recording medium, phase-search-signal generating means for applying a phase search signal to the charging electrode to electrify an ink droplet, phase detecting means for searching the phase of production of the ink droplet electrified by the phase search signal, on the basis of the electric charge of the ink droplet, changeover means for selectively applying one of the recording signal and the phase search signal to the charging electrode, and a control circuit for synthetically controlling the ink ejecting means, recording-signal generating means, deflection means, phase-search-signal generating means, phase detecting means, and changeover means, wherein the charging electrode includes a pair of independent electrode plates disposed so that the electrode plates face each other and the flying path of ink droplets is interposed between the electrode plates, and the changeover means includes an electric circuit for connecting the phase-search-signal generating means and the phase detecting means to one and the other of the electrode plates, respectively, at a phase search period, to apply the phase search signal to one of the electrode plates and detect a current appearing on the other electrode plate. That is, in the ink jet recording apparatus according to the present invention, the charging electrode is used both for the electrification of a ink droplet and for the detection of the electric charge thereof. Accordingly, it is prevented to make long the flying path of ink droplets, and to pass a useless current through an ink supply system. Further, noise generated in the ink supply system by external disturbances is prevented from causing a detection error when the electric charge of an ink droplet is detected.

DESCRIPTION OF THE PREFERRED EMBODIMENTS

Now, the present invention will be explained below, on the basis of embodiments thereof.

Figure 1:
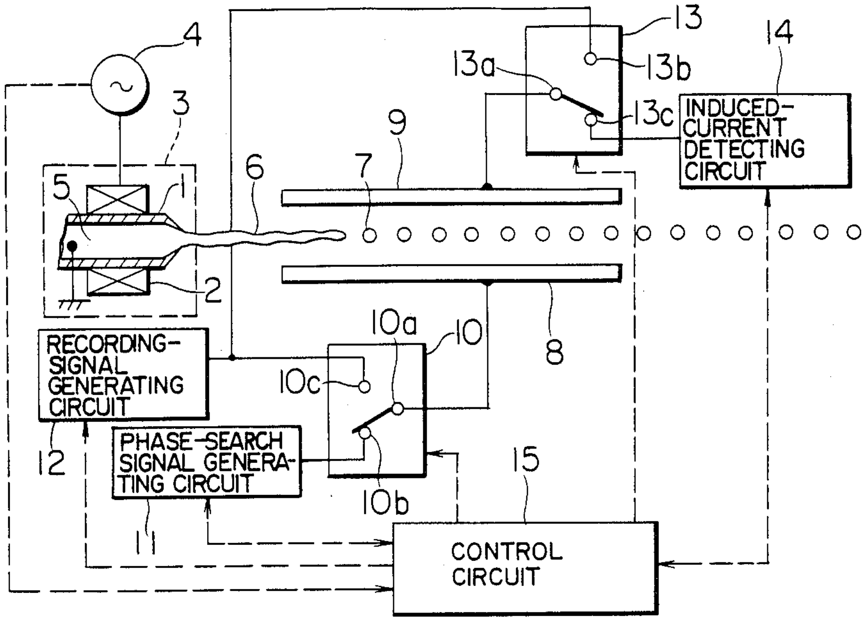
FIG. 1 is a block diagram, partly pictorial, of an embodiment of an ink jet recording apparatus according to the present invention.

FIG. 1 shows an embodiment of an ink jet recording apparatus according to the present invention. Referring to FIG. 1, a nozzle 1 and a piezo-electric element 2 mounted on the nozzle 1 make up ink-droplet generating means 3. The piezo-electric element 2 is applied with an exciting voltage from a high-frequency power source 4, to make the nozzle 1 vibrate. Pressurized ink 5 is ejected from the nozzle 1, to form an ink column 6. When the nozzle 1 vibrates, constricted portions are generated in the ink column 6 periodically along the axis thereof. The constriction at a constricted portion increases as the distance between the constricted portion and nozzle is larger. Thus, an end portion of the ink column 6 is separated from the column 6, and an ink droplet 7 is formed. In a region where the ink column 6 is changed into ink droplets, a pair of electrode plates 8 and 9 are disposed along the flying path of the ejected ink so as to face each other with this flying path between these electrode plates. The electrode plate 8 is connected to a movable contact 10*a* of a first changeover switch 10, and a phase-search-signal generating circuit 11 and a recording-signal generating circuit 12 are connected to fixed contacts 10*b* and 10*c* of the first changeover switch 10, respectively. Thus, one of a phase search signal from the circuit 11 and a recording signal from the circuit 12 is selectively applied to the electrode plate 8. The electrode plate 9 is connected to a movable contact 13*a* of a second changeover switch 13, and the phase-search-signal generating circuit 12 and an induced-current detecting circuit 14 are connected to fixed contacts 13*b* and 13*c* of the second changeover switch 13. Thus, one of the circuits 12 and 14 is selectively connected to the electrode plate 9. Each of the first and second changeover switches 10 and 13 may be formed of an electronic switch, if necessary. A control circuit 15 is formed of a microcomputer or the like. The control circuit 15 controls respective phases of the phase search signal and recording signal on the basis of the phase of the exciting voltage from the high-frequency power source 4, controls the first and second changeover switches 10 and 13 to change one of a phase search operation mode and a recording operation mode over to the other mode, thereby controlling the effective operating time of the induced-current detecting circuit 14, and detects the phase of ink droplet production from the output of the induced-current detecting circuit 14 and the phase of the phase search signal. Ink droplets 7 which have been controllably electrified between the electrode plates, fly between a pair of deflecting electrode plates, to be deflected in accordance with their electric charge. Then, ink droplets which have been electrified by the recording signal, are deposited on a recording medium, and other ink droplets which have been electrified by the phase search signal or have no electric charge, are caught by a collector. The deflecting electrode plates, recording medium, and collector are arranged in the same manner as described in the previously-referred U.S. Pat. Nos. 4,016,571 and 4,121,223. Accordingly, detailed explanation of these parts and an arrangement view thereof will be omitted.

Figure 2:
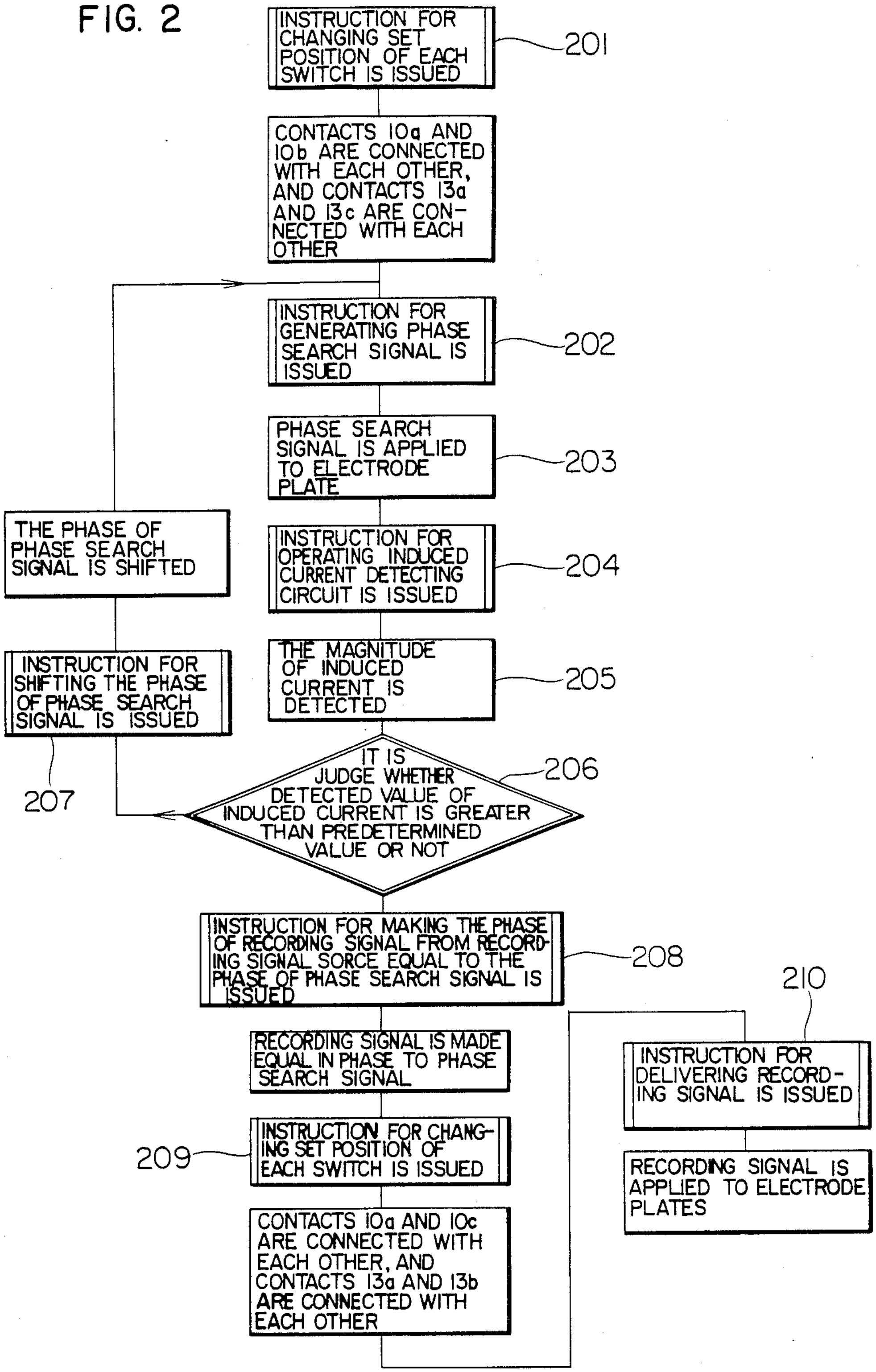
FIG. 2 is a flow chart showing the control operations performed in the embodiment shown in FIG. 1.

Next, explanation will be made of the control operations performed in the present embodiment, with reference to FIG. 2.

In step 201, an instruction for changing the set position of each switch is issued from the control circuit 15. Thus, the movable contact 10*a* of the first changeover switch 10 is connected with the fixed contact 10*b* thereof, and the movable contact 13*a* of the second changeover switch 13 is connected with the fixed contact 13*c* thereof.

In step 202, an instruction for generating the phase search signal is issued from the control circuit 15. Thus, the phase search signal having a phase is generated by the phase-search-signal generating circuit 11, and is applied to the electrode plate 8 (step 203). The phase search signal is formed of, for example, a voltage pulse having a width smaller than one period of the exciting voltage. The phase difference between the phase search signal and the exciting voltage can be successively changed. The phase search signal at a first stage is different in phase from the exciting voltage by an ammount $\alpha_1$. A plurality of ink droplets 7 are electrified by the phase search signal having the phase $\alpha_1$. When the charged ink droplets 7 fly along the electrode plate 9, an induced current is generated in the electrode plate 9, in proportion to the electric charge of the ink droplets. The induced current can be clearly detected immediately after a phase-search-signal generationg period has ended. Accordingly, when the phase-search-signal generating period is over, an instruction for operating the induced-current detecting circuit is issued from the control circuit 15 (step 204). Thus, the magnitude of the induced current generated in the electrode plate 9 is detected by the induced-current detecting circuit 14 (step 205). When the detected value is less than a predetermined value, it is judged by the control circuit 15 that the phase of ink droplet production does not match the phase of generation of the phase search signal (step 206), and an instruction for shifting the phase of generation of the phase search signal is issued from the control circuit 15 (step 207). Thus, the phase of generation of the phase search signal is shifted so as to become equal to a value $\alpha_2$, by the phase-search-signal generating circuit 11. Then, the processing in the steps 202 to 206 is again carried out. The phase of generation of the phase search signal is successively shifted in the above-mentioned manner, and the processing in the steps 202 to 207 is repeated. When the detected value of the induced current is equal to or greater than the predetermined value, it is judged in the step 206 that the phase of ink droplet production matches the phase of the phase search signal, and the processing in step 208 is carried out. That is, the control circuit 15 instructs the recording-signal generating circuit 12 to make the recording signal equal in phase to the phase search signal whose phase matches the phase of ink droplet production. Thus, the phase of the recording signal matches the phase of the ink droplet production.

Next, an instruction for changing the set position of each switch circuit is issued from the control circuit 15 (step 209). Thus, the movable contact 10*a* of the first changeover switch 10 is connected with the fixed contact 10*c* thereof, and the movable contact 13*a* of the second changeover switch 13 is connected with the fixed contact 13*b* thereof.

When a time for starting a recording operation has come, the control circuit 15 instructs the recording-signal generating circuit 12 to deliver the recording signal (step 210). Thus, the recording signal is applied to the electrode plates 8 and 9, and ink droplets 7 are surely charged with electricity. Though only one of the electrode plates 8 and 9 may be applied with the recording signal, it is desirable to apply the recording signal to both of the electrode plates 8 and 9, since the charging efficiency is enhanced.

The above-mentioned embodiment has the following advantages.

(a) Since the electrode plate 9 serves not only as the charging electrode plate but also as the detection electrode plate, it is unnecessary to dispose a sensor on the flying path of ink droplets. Accordingly, it is not required to make long the flying path of ink droplets, and thus the deviation of flying path is not increased.

(b) No useless leakage current flows through an ink supply system, and therefore there is no danger of ink changing in quality.

(c) Since the electrode plate 9 is isolated from the ink supply system, noise generated in the ink supply system does not cause any detection error.

(d) In the phase search period, a time the phase search signal is generated, is made different from a time the electric charge of ink droplet is detected. Accordingly, the electric charge of ink droplet is detected without being affected by the phase search signal, and thus detection accuracy is improved.

(e) The recording signal is applied to a pair of electrode plates 8 and 9, and therefore the charging efficiency is high.

Figure 3:
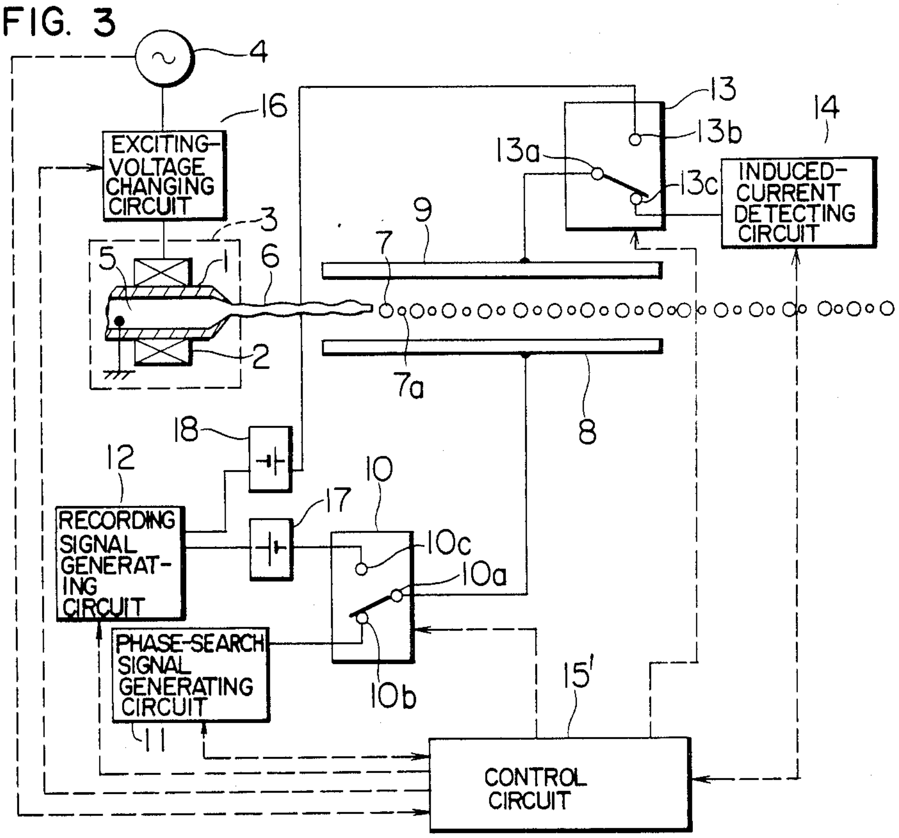
FIG. 3 is a block diagram, partly pictorial, of another embodiment of an ink jet recording apparatus according to the present invention.
Figure 4:
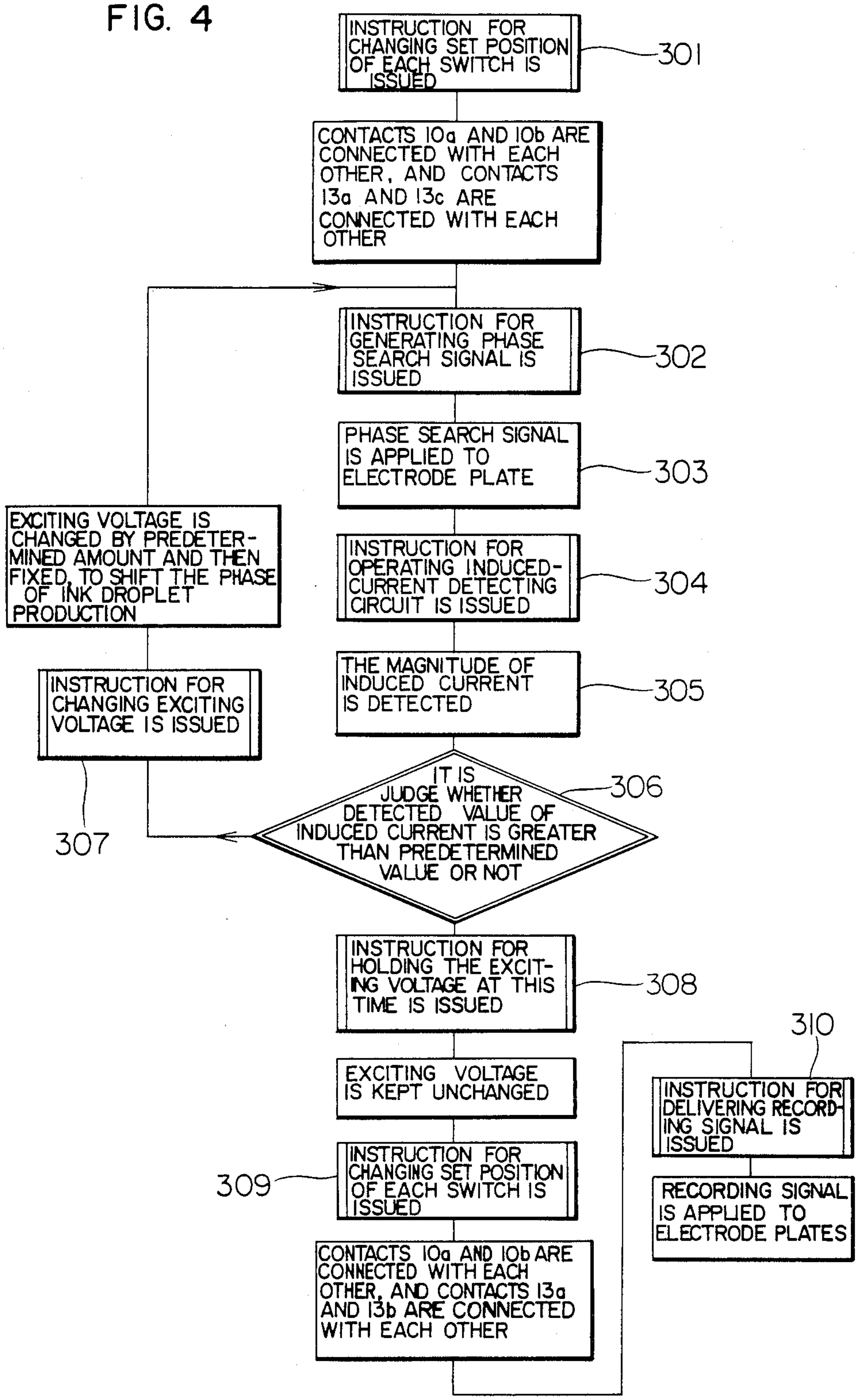
FIG. 4 is a flow chart showing the control operations performed in the embodiment shown in FIG. 3.

FIGS. 3 and 4 are views for explaining another embodiment of an ink jet recording apparatus according to the present invention, that is, a micro-dot ink jet recording apparatus according to the present invention. When the nozzle of an ink jet recording apparatus is put in an appropriate vibrating state, an ink droplet having a large diameter and an ink droplet having a small diameter (namely, a micro-dot ink droplet 7*a*) are alternately separated from the ink column. Thus, ink jet recording can be made using the micro-dot ink droplet.

FIG. 3 shows a micro-dot ink jet recording apparatus according to the present invention. In FIG. 3, the same reference symbols as in FIG. 1 designate like parts. Referring to FIG. 3, an exciting-voltage changing circuit 16 is connected between the high-frequency power source 4 and the piezo-electric element 2. Further, a bias voltage generating circuit 17 is connected between the fixed contact 10*c* of the first changeover switch 10 and the recording-signal generating circuit 12, and another bias voltage generating circuit 18 is connected between the fixed contact 13*b* of the second changeover switch 13 and the recording-signal generating circuit 12. Bias voltages which are opposite in polarity to each other, are generated by the bias voltage generating circuits 17 and 18, and are superposed on the recording signal. A control circuit 15' controls the whole of the apparatus in such a manner as mentioned below.

FIG. 4 is a flow chart showing control operations which are performed in the recording apparatus shown in FIG. 3. The phase search signal delivered from the phase-search-signal generating circuit 11 has the same waveform as in the embodiment shown in FIG. 1, a phase difference between the phase search signal and the exciting voltage is first set to a predetermined value. Further, the recording signal delivered from the recording-signal generating circuit 12 is made equal in phase to the phase search signal. Accordingly, when the phase of ink droplet production is appropriately set so that some ink droplets are well electrified by the phase search signal, subsequent ink droplets can be surely electrified by the recording signal.

Referring now to FIGS. 3 and 4, an instruction for changing the set position of each changeover switch is issued from the control circuit 15' (step 301). Thus, the movable contact 10*a* of the first changeover switch 10 is connected with the fixed contact 10*b* thereof, and the movable contact 13*a* of the second changeover switch 13 is connected with the fixed contact 13*c* thereof. In step 302, an instruction for generating the phase search signal is issued from the control circuit 15'. Thus, the phase search signal having a predetermined phase is generated by the phase-search-signal generating circuit 11, and is applied to the electrode plate 8 (step 303). When a phase-search-signal generating period is over, an instruction for operating the induced-current detecting circuit is issued from the control circuit 15' (step 304). Thus, the magnitude of the induced current generated in the electrode plate 9 is detected by the induced-current detecting circuit 14 (step 305). When the detected value is less than a predetermined value, it is judged by the control circuit 15' that the phase of production of the micro-dot ink droplet 7*a* does not match the phase of generation of the phase search signal (step 306), and an instruction for changing the exciting voltage is issued from the control circuit 15' (step 307). Thus, the exciting-voltage changing circuit 16 changes the amplitude of the exciting voltage by a predetermined amount, to shift the phase of ink droplet production. Then, the processing in the steps 302 to 306 is again performed. The amplitude of the exciting voltage is successively changed, and the above-mentioned processing is repeated. When the detected value of the induced current is equal to or greater than the predetermined value, it is judged in the step 306 that the phase of production of the micro-dot ink droplet 7*a* matches the phase of generation of the phase search signal, and the processing in step 308 is carried out. That is, the control circuit 15' instructs the exciting-voltage changing circuit 16 to hold an exciting voltage at which the above-mentioned matching is attained. The exciting-voltage changing circuit 16 keeps the exciting voltage unchanged, in accordance with the instruction.

Next, an instruction for changing the set position of each changeover switch is issued from the control circuit 15' (step 309). Thus, the movable contact 10*a* of the first changeover switch 10 is connected with the fixed contact 10*c* thereof, and the movable contact 13*a* of the second changeover switch 13 is connected with the fixed contact 13*b* thereof.

When a time for starting a recording operation has come, the control circuit 15' instructs the recording-signal generating circuit 12 to deliver the recording signal (step 310). Thus, the recording signal is applied to the electrode plates 8 and 9, and micro-dot ink droplets 7*a* are surely charged with electricity. The micro-dot ink droplets 7*a* thus charged are deflected in accordance with the electric charge thereof, by a deflection voltage which is supplied from the bias-voltage generating circuits 17 and 18.

As can be seen from the above, the micro-dot ink jet recording apparatus according to the present invention has the same advantages as the embodiment shown in FIG. 1.

As has been explained in the forgoing, in an ink jet recording apparatus according to the present invention, a pair of electrode plates are disposed in a region where ink is changed into ink droplets, in such a manner that the electrode plates face each other and the flying path of ink droplets is interposed between the electrode plates, phase-search-signal generating means and phase detecting means are connected to one and the other of the electrode plates, respectively, to search the phase of ink droplet production, and a recording signal is applied to the electrode plates at a recording period to charge ink droplets with electricity. Accordingly, it is not required to make long the flying path of ink droplets, and therefore the deviation of flying path is not increased. Further, no useless leakage current flows through an ink supply system, and therefore there is no danger of ink changing in quality. Furthermore, noise generated in the ink supply system does not cause any detection error when the electric charge of ink droplet is detected. That is, according to the present invention, there is provided an ink jet recording apparatus which can record an image accurately on a recording medium.

I claim:

1. An ink jet recording apparatus including means for ejecting ink to change the ejected ink into ink droplets, a charging electrode disposed in the vicinity of a region where the ejected ink is changed into ink droplets, recording-signal generating means for applying a recording signal to said charging electrode to electrify an ink droplet, deflection means for deflecting said ink droplet in accordance with the electric charge thereof given by said recording signal, to deposit said ink droplet on a recording medium, phase-search-signal generating means for applying a phase search signal to said charging electrode to electrify an ink droplet, phase detecting means for searching the phase of production of said ink droplet electrified by said phase search signal, on the basis of the electric charge of said ink droplet, changeover means for selectively applying one of said recording signal and said phase search signal to said charging electrode, and a control circuit for synthetically controlling said ink ejecting means, said recording-signal generating means, said deflection means, said phase-search-signal generating means, said phase detecting means, and said changeover means, wherein said charging electrode includes a pair of independent electrode plates disposed so that said electrode plates face each other and the flying path of ink droplets is interposed between said electrode plates, and said changeover means includes an electric circuit for connecting said phase-search-signal generating means and said phase detecting means to one and the other of said electrode plates, respectively, at a phase search period, to apply said phase search signal to one of said electrode plate and detect a current appearing on the other electrode plate.

2. An ink jet recording apparatus according to claim 1, wherein at said phase search period, said phase-search-signal generating means and said phase detecting means are controlled by said control circuit so that a phase detecting operation is prevented during a time when said phase search signal is generated, and is performed after the generation of said phase search signal has terminated.

3. An ink jet recording apparatus according to claim 1, wherein said changeover means includes an electric circuit for connecting said recording-signal generating means to both of said electrode plates at a recording period.

* * * * *